United States Patent
Kronenberg et al.

(10) Patent No.: US 6,405,265 B1
(45) Date of Patent: *Jun. 11, 2002

(54) DEVICE DRIVER FOR ACCESSING COMPUTER FILES

(75) Inventors: Pierre-Michel Kronenberg, Longmont; Derek T. Zahn, Boulder, both of CO (US)

(73) Assignee: Mijenix Corporation, Boulder, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/293,685

(22) Filed: Apr. 16, 1999

Related U.S. Application Data (63) Continuation-in-part of application No. 08/643,454, filed on May 8, 1996, now Pat. No. 5,907,703.

(51) Int. Cl.[7] .............................................. G06F 9/54
(52) U.S. Cl. ........................... 709/321; 707/1; 713/189
(58) Field of Search ............................... 709/321–327; 713/190, 182–194; 707/1–10

(56) References Cited

U.S. PATENT DOCUMENTS

| | | | | |
|---|---|---|---|---|
| 5,414,850 | A | 5/1995 | Whiting | 709/321 |
| 5,457,681 | A | 10/1995 | Gaddis et al. | 370/402 |
| 5,572,209 | A | 11/1996 | Farmer et al. | 341/67 |
| 5,628,010 | A | 5/1997 | Ooishi et al. | 707/1 |
| 6,185,686 | B1 * | 4/2000 | Glover | 713/190 |

OTHER PUBLICATIONS

Stump, Laine, "Better Zipping," EXE: The Software Developers' Magazine, pp(12), May 1993.*
Microsoft Resource Kit, Microsoft Press, "Using Disk Compression with Windows 95" Apr. 10, 1995.
"Stacker Coprocessor Card with MS–DOS and EMM386.EXE," Microsoft Knowledge Base, PSS ID Number; Nov. 22, 1994.
"Stacker Disk–Compression Utility with Windows," Microsoft Knowledge Base, PSS ID No.:Q71787; Nov. 22, 1994.
"Microsoft Plus! Drvspace.txt File Contents," Microsoft Knowledge Base, PSS ID No.: Q138310; Jan. 23, 1996.
"Using Disk Compression with Windows 95," Microsoft Windows 95 Resource Kit, Microsoft Windows 95 Resource Kit, Microsoft Developer Network Library CD, Apr. 1996.
"Compact—Notes," "Compact," "Expand" "Create More Disk Space by Using Disk Compression on NTFS Volumes," Microsoft Windows NT 4.0 Help file, 1996.
Mark Nelson and Jean–Loup Gailly, "The Data Compression Book," M & T Books, Second Edition 1996, pp. 209–212.
Ruediger R. Asche, "The Little Device Driver," Microsoft Development Network Technology Group. Technical Articles: Windows: Drivers, Microsoft Developer Network Library CD, Apr. 1996.
"Introduction to Windows 95 Device Drivers,"DDK: Windows 95 Device Driver Kit, Microsoft Developer Network Library CD, Apr. 1996.

(List continued on next page.)

*Primary Examiner*—St. John Courtenay, III
(74) *Attorney, Agent, or Firm*—Jenkens & Gilchrist (57) ABSTRACT

A computer device driver for accessing modified files held in archives in a memory device by reading a modified file from an archive in the memory device, demodifying the file in RAM and retaining the demodified file in RAM in whole or in part so that operations to the memory device can be performed on the demodified file by the operating system without having first to write the demodified file to the memory device. The device driver also accesses the file in said RAM and changes the contents of the file; and returns the file to the archive in said memory device.

77 Claims, 5 Drawing Sheets

OTHER PUBLICATIONS

"DOS/Win32 Installable File System Specifications" DDK: Windows 95 Device Driver Kit, Microsoft Developer Network Library CD, Apr. 1996.

"StuffIt SpacerSaver User's Guide," Alladin System, Inc., Sep. 1994, pp. 19–28.

* cited by examiner

DEVICE DRIVER FOR ACCESSING COMPUTER FILES

CROSS-REFERENCE TO RELATED APPLICATION

This application is a continuation-in-part of application Ser. No. 08/643,454, filed May 8, 1996 now U.S. Pat. No. 5,907,703, and entitled "Device Driver for Accessing Computer Files."

FIELD OF INVENTION

The invention relates generally to device drivers in computer systems with memory devices. In particular, the invention relates to device drivers which provide for accessing and updating modified files (such as compressed or encrypted files) on disk storage devices, particularly in personal computer systems.

SUMMARY OF THE INVENTION

It is an object of the invention to provide for the fast and efficient accessing and updating of modified files (such as compressed or encrypted files) stored on storage devices.

A further object of the invention is to provide a system which displays archives as folders and provides for the fast accessing and updating of files on storage devices.

Still another object of the invention is to provide a system in which virtual folders are accessible by an operating system.

Yet another object of the invention is to provide a system which accesses modified files in memory for a user in a simple and understandable manner and which uses a minimal number of steps in performing the access.

In accordance with the present invention, the foregoing objectives are realized by a computer device driver for interfacing with an operating system and for accessing modified files held in archives in a memory device, said device driver comprising: means for reading a modified file from an archive in said memory device, demodifying said file in RAM and retaining the demodified file in RAM in whole or in part so that operations can be performed on the demodified file by the operating system without having first to write the demodified file to the storage device; means for accessing said file in said RAM and changing the contents of said file; and means for returning said file to said archive in said storage device.

DESCRIPTION OF THE PREFERRED EMBODIMENT

Several illustrative embodiments of a device driver are described below as they might be implemented to provide for improved methods of accessing modified files. It will of course be appreciated that in the development of any actual implementation, numerous implementation-specific decisions must be made to achieve the developers specific goals and subgoals which will vary from one implementation to another. Moreover, it will be appreciated that such a development effort might be complex and time-consuming, but would nevertheless be a routine undertaking of device engineering for those of ordinary skill having the benefit of this disclosure.

Figure 1:
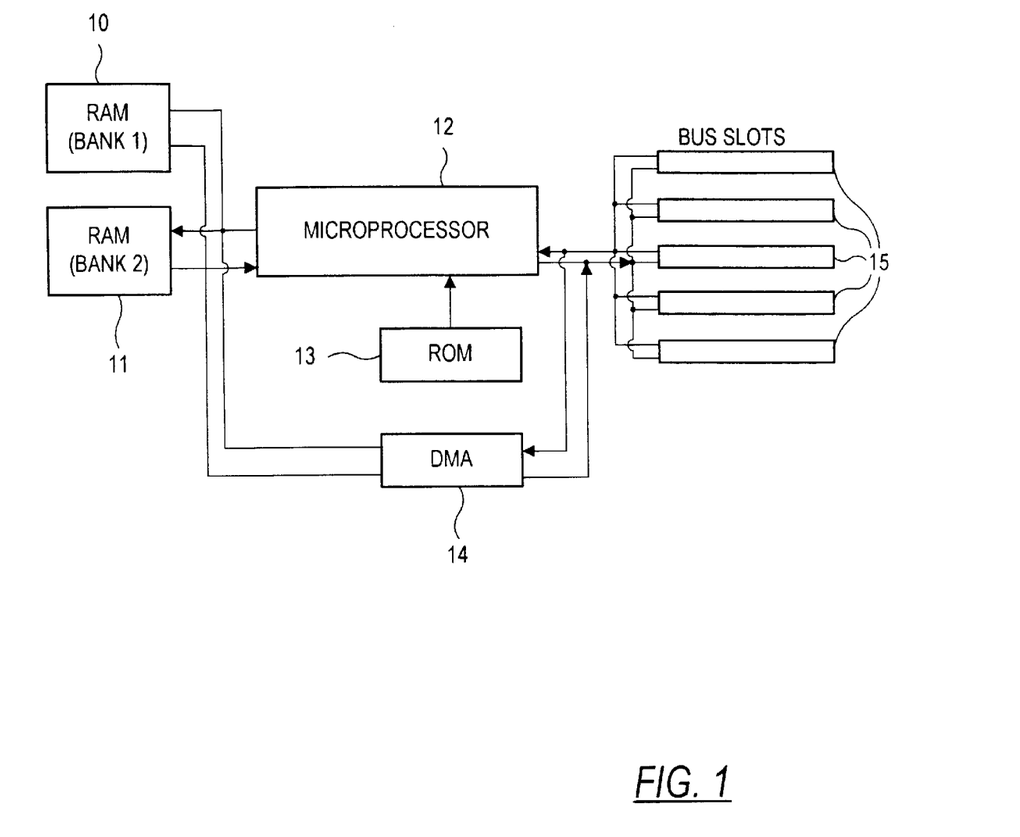
FIG. 1 is a block diagram of a computer system using a device driver according to principles of the present invention.

The general architecture of the computer system that is one embodiment of this invention is shown in FIG. 1. The computer main memory or RAM can be divided into banks 10 and 11 and contain data, intermediate results as well as programs stored by the microprocessor 12. The microprocessor 12 can also execute instructions stored in ROM 13. The microprocessor 12 can be, for example, a i486 or Pentium processor manufactured by Intel Corporation. The ROM contains the Basic Input Output System (BIOS) which is a set of programs and data that are executed by the microprocessor at power-up. The BIOS also provides various support routines for input/output access and control. Also shown is a direct memory access (DMA) unit 14 which provides for the direct transfer of data from an outside source (connected at bus 15) and the RAM.

Figure 2:
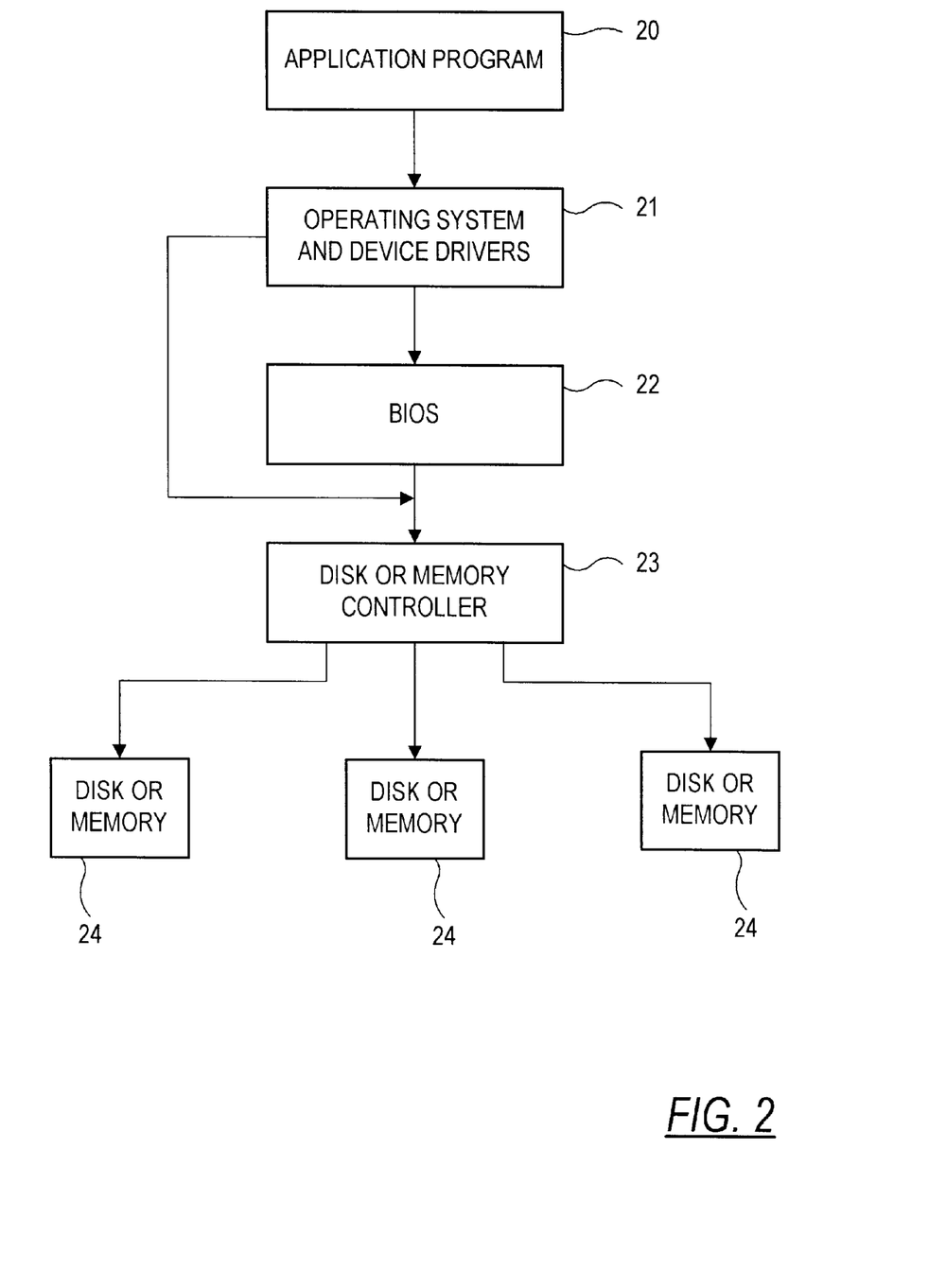
FIG. 2 is a block diagram of the software hierarchy according to principles of the present invention.

FIG. 2 illustrates the various levels of software present in a preferred embodiment of the invention. At the top level is an application program 20, at a lower level is an operating system 21, and at an even lower level is BIOS 22. The operating system 21 is layered as well. Its center is occupied by the Kernel which comprises at least the routines for memory management, executing task switches, and handling critical errors. Device rivers run in a layer on top of the Kernel and supply functions such as data and file management, character input, hardware device interfaces, and drive access. The operating system can also use device drivers to bypass BIOS and access devices directly.

Figure 3:
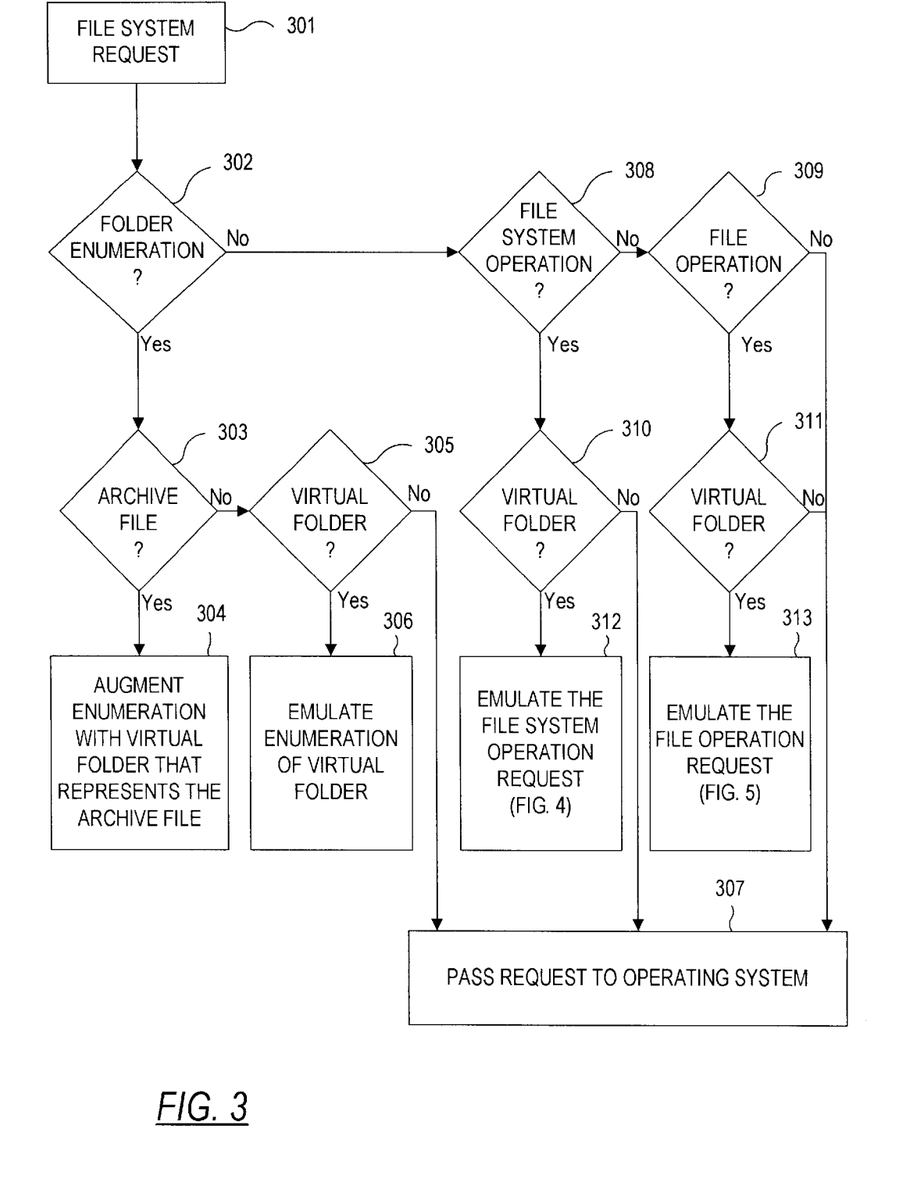
FIG. 3 is a block diagram describing the operation of the device driver according to principles of the present invention.
Figure 4:
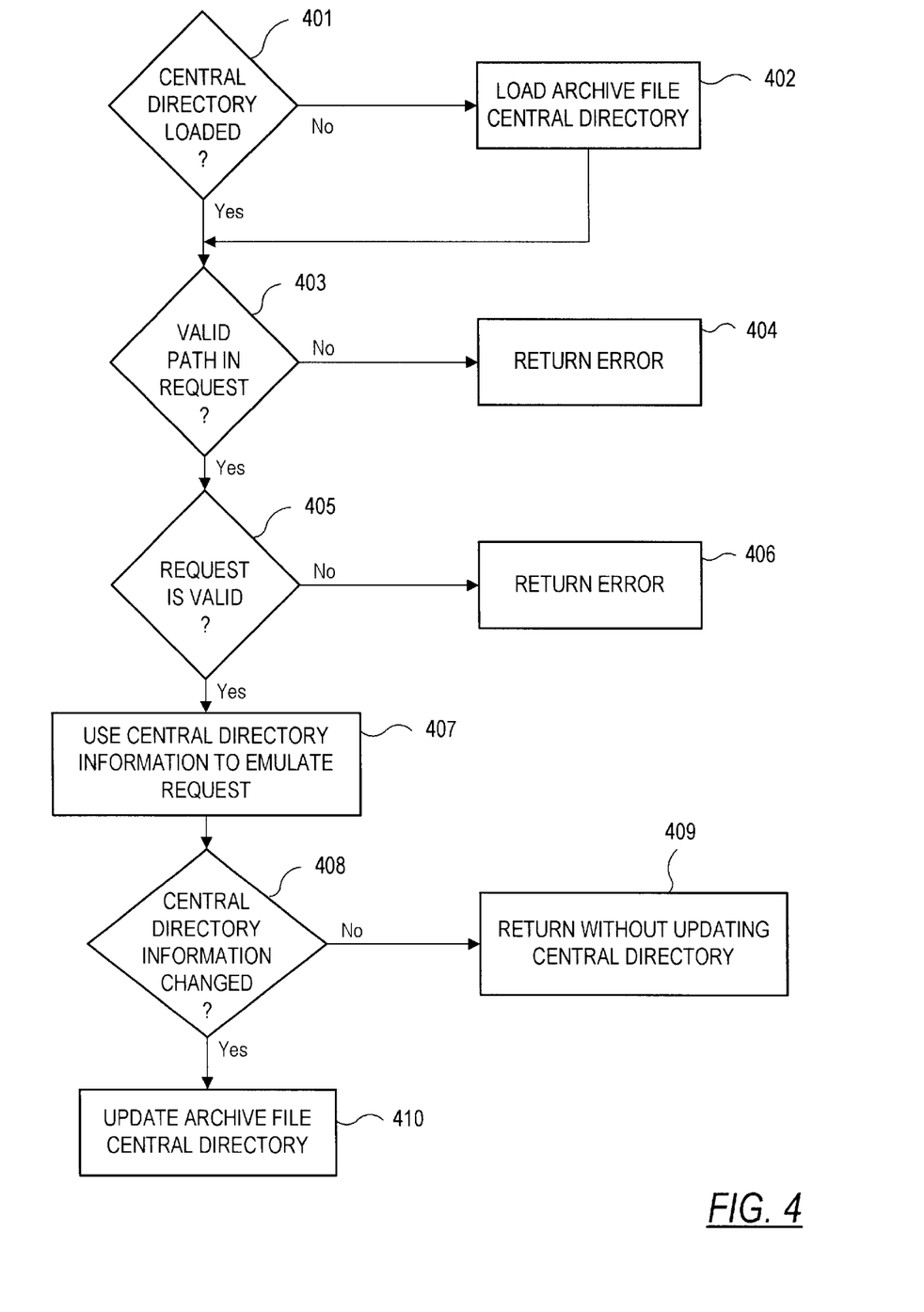
FIG. 4 is a flowchart illustrating the operation of the device driver according to principles of the present invention.
Figure 5:
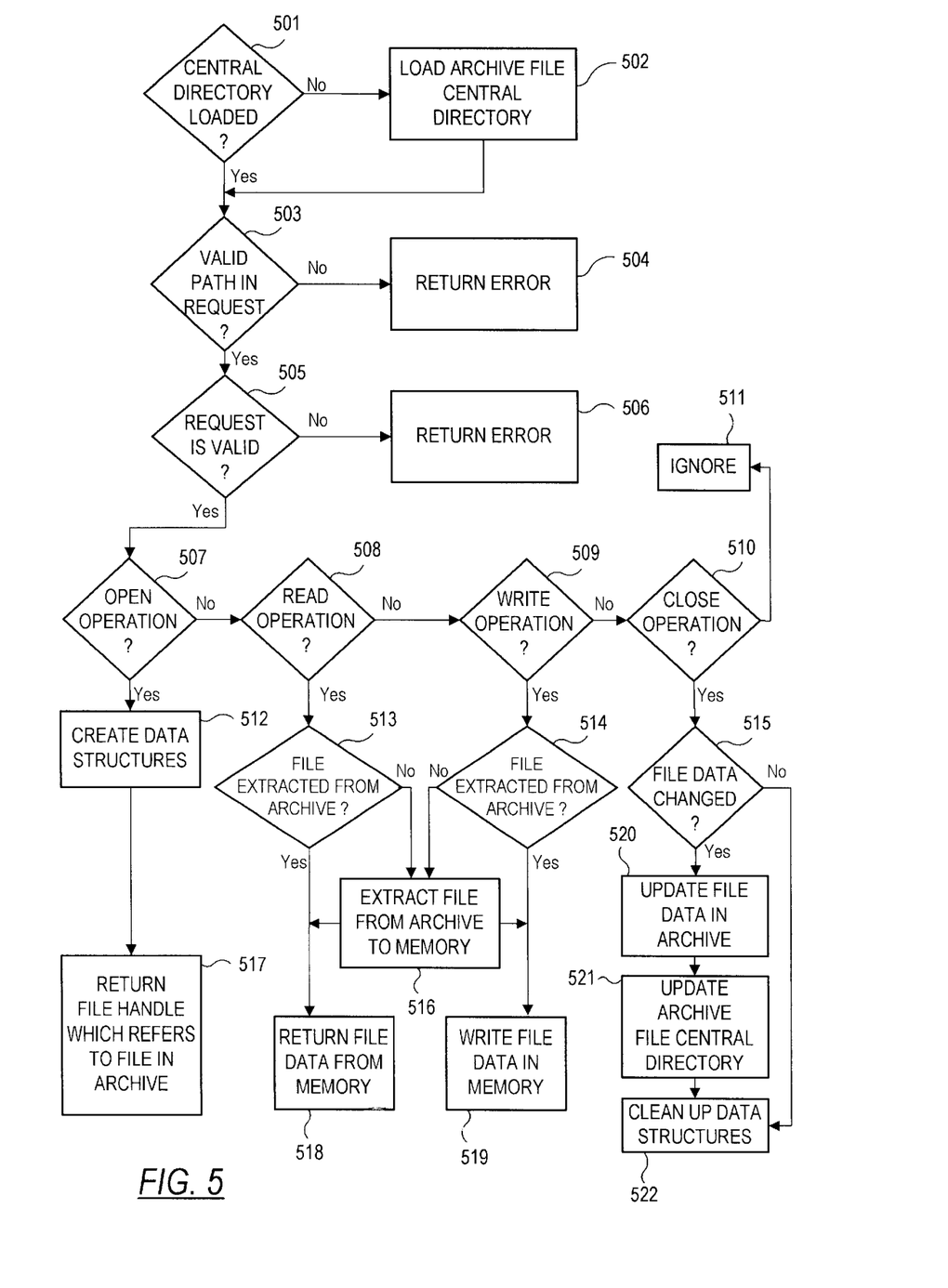
FIG. 5 is a flowchart illustrating the operation of the device driver according to principles of the present invention.

Turning next to FIGS. 3, 4, and 5 a preferred embodiment of a device driver program embodying the present invention begins by receiving a file system request from the operating system at step 301. The file system request contains information indicating the type of request to be performed, the identity of the file on which the operation is to be performed, and any other information needed to perform a successful operation. The operation specified in the file system request may be an operation to enumerate the contents of a folder, perform file system operations which do not modify the contents of a file, or perform some type of operation that modifies the contents of a particular file.

At step 302, the driver determines if the file system request is a request to enumerate the contents of a folder. If the answer at step 302 is affirmative, then at step 303, the driver checks to see if the enumeration points to an archive file. The term "archive" is defined to mean a file which contains modified files or other folders (which themselves contain files and folders). For example, in a file system where modified files are denoted by using a .CYP suffix, step 303 checks to see if a file with a .CYP suffix is the subject of the enumeration.

If the answer to step 303 is affirmative, then at step 304 the device driver creates, in RAM, a virtual folder that represents the archive file. A virtual folder appears to user programs and the operating system as a folder containing files and folders but is not actually stored as a folder in the underlying storage device. The device driver then augments the enumerated request with information describing the virtual folder and passes this information to the operating system. This information includes file attributes and a time and date stamp. By virtual, it is meant that the folder exists in RAM only and is, therefore, temporary since upon program completion, the folder disappears. At this point, nothing is contained inside the virtual folder.

If the answer at step 303 is negative, then the driver checks to see if the information requested in the file system request is a description of the contents of a virtual folder at step 305. If the answer to step 305 is affirmative, then the contents of the virtual folder are revealed at step 306. By "revealing", it is meant that the contents are made available to the operating system. These contents are contents of the archive that the virtual folder represents. If the answer to step 305 is negative, then the request is passed to the operating system at step 307.

If step 302 determines that a folder enumeration is not requested, then the driver determines at step 308 whether a file system operation is requested. A file system operation includes operations such as a "rename", "copy", "move", "delete", or "get attributes" operations. If the operation requested is a file system operation, then the driver continues at step 310 by checking to see if the requested operation is for a file contained in a virtual folder. If the file is contained in a virtual folder, then the driver continues with step 312 where it emulates (performs) the file system operation request. Step 312 is expanded in the flowchart of FIG. 4 and discussed in greater detail below.

If the answer at step 310 is negative, then at step 312 the request is passed to the operating system. In this case, a file would not be in a virtual folder and the operating system can perform the operation using its normal procedures.

If the answer at step 308 is negative, then at step 309 the driver checks to see if the request is for a file operation. By a file operation, it is meant "read", "write", "open" or "close" file operations. If the answer is negative, then at step 307, the request is passed onto the operating system. If the answer is affirmative, then at step 311, the system checks to see if the file is in a virtual folder. If it is not, the driver, passes the request to the operating system at step 307. However, if it is, at step 313 the driver emulates the file request operation. Step 313 is expanded in the flowchart of FIG. 5 and discussed in greater detail below.

Turning next to FIG. 4, the emulation of a file system operation begins at step 401 when the driver checks to see if the central directory of the archive has been loaded into RAM. The central directory is an index of files and can be represented, for example, by a conventional tree structure. If the directory has not been loaded, then at step 402 the driver loads the central directory structure. The driver then continues with step 403.

If the central directory is loaded, then at step 403 the driver checks to see if the request is valid, i.e., that the file exists in the archive. If the request is not valid, then the driver posts an error message to the operating system at step 404.

If the path is valid, the driver next determines at step 405 whether the request is valid, i.e., whether all the correct parameters are present in the request. For example, for a copy operation whether a source and destination information are included. If the request is not valid, then at step 406 the driver reports an error to the operating system.

If the request is valid, then at step 407, the driver uses the central directory information to emulate a request. In other words, the central directory is modified to account for the differences due to the addition and deletion of files. For example, in a delete operation, the file is removed from the archive and the central directory is changed to reflect the deletion.

If the operation is a copy or a move, then the driver proceeds to FIG. 5. After executing the steps enumerated in FIG. 5, the driver then returns to the flowchart of FIG. 4 at step 408.

At step 408, the driver determines whether the central directory information has been changed. If it has not changed, then, at step 409 the procedure ends by returning to the operating system without updating the central directory. On the other hand, if the central directory structure has changed, then at step 410 the driver updates the archive central directory and the files affected in the archive.

Turning next to the flowchart of FIG. 5, emulation of a file operation begins when the driver determines whether the central directory has been loaded from the disk at step 501. As described above, the central directory is an indexed listing of the contents of the archive. The directory can be represented, for example, by a tree structure. If the directory is not loaded from disk, then at step 502 the driver loads the directory from the hard drive and then control proceeds to step 503. If the driver determines that the directory is loaded, then the driver also continues by executing step 503.

If the central directory has been loaded, then at step 503 the driver checks to see if the request is valid, i.e., that the file exists in the archive. If the request is not valid, then the driver posts an error message to the operating system at step 504.

If the path is valid, the driver next determines at step 505 whether the request is valid, i.e., whether all the correct parameters are present in the request. For example, for an open operation whether the source file is already open for writing by another process. If the request is not valid, then at step 506 the driver reports an error to the operating system.

At step 507, the driver determines whether the operation is an open operation, that is, a request to open a file and obtain a handle for it. If the operation is an open operation, at step 512 the driver creates data structures in RAM necessary for opening the file. Next, at step 517 the driver returns a file handle which refers to the file in the archive. A handle is a unique identifier, such as a number or pointer, that serves to identify the file. Upon a read operation, the driver will check whether a handle is present.

If the answer to step 507 is negative, that is the operation is not an open operation, then at step 508 the driver determines whether the operation is a read operation. If the answer is affirmative, then at step 513, the driver determines whether the file has been extracted from the archive. Such files will have been already demodified such as by decompression or decryption. If it has, at step 518 the driver provides the file information requested by the read operation. If the answer at step 513 is negative, then at step 516, the driver extracts the file from the archive and places it in RAM before proceeding with step 518. As part of this extracting operation, modified files are demodified such as by decompressing or decrypting them. When the file is modified by decryption, the decryption key is obtained prior to extracting the file at step 516.

If the answer to step 508 is negative, that is the operation is not a read operation, then at step 509 the driver determines whether the operation is a write operation. If the answer is affirmative, then at step 514, the driver determines whether the file has been demodified such as by decompression or decryption. If it has, at step 519 the driver copies the write data to memory. If the answer at step 514 is negative, then at step 516, the driver extracts the file from the archive and places it in RAM before proceeding with step 519. Again, as part of this extracting operation, modified files are demodified such as by decompressing or decrypting them. When the file is modified by decryption, the decryption key is obtained prior to extracting the file at step 516. If the answer to step 509 is negative, in other words, the operation is not a write, step 510 checks to see if the operation is a close operation. If the operation is not a close, the driver returns control to the operating system at step 511 and ignores the attempted operation.

If the answer to step 510 is affirmative, then at step 515 the driver determines if the file data has changed. If no changes are detected, then at step 515 the data structures are cleaned up. By cleaning up, it is meant that the memory allocated at step 512 is released as well as the memory allocated for the file data. On the other hand, if the file data has changed, the driver continues at step 520 where it updates the archive data file on disk. That is, it writes the data from RAM to the appropriate place in disk. Control then proceeds to step 521 where the archive central directory structure is updated. The procedure concludes at step 522 where any data structures left over are cleaned up, i.e., removed so that space can be used by other programs.

As discussed above, the driver of the present invention has the advantage that the contents of an archive, i.e., its modified files and folders, are made available throughout the operating system. That is, a user and the operating system have full access to the contents of an archive through the virtual folder that represents the archive no matter what function the operating system is performing.

The driver above also is fast and efficient. This is because the virtual folder and all files that are accessed in the archive are cached in RAM. As is well known in the art, using RAM to house files is a fast and efficient method for file manipulation.

The driver is efficient for other reasons. The user sees a "real" file when it is in fact virtual using the above mechanism. The user can perform operations on the file directly without having to first explicitly modify and/or demodify data.

The driver also makes accessing modified files stored in memory easy and simple for the user since the user is not required to start and execute a separate decryption or decompression program.

While the present invention has been described with reference to one or more particular embodiments, those skilled in the art will recognize that many changes may be made thereto without departing from the spirit and scope of the present invention, which is set forth in the following claims.

What is claimed is:

1. A computer device driver for interfacing with an operating system and for accessing modified files held in archives in a storage device, said device driver comprising:
    means for reading a modified file from an archive in said memory device, demodifying said file in RAM and retaining the demodified file in RAM in whole or in part so that operations can be performed on the demodified file by the operating system without having first to write the demodified file to the storage device,
    means for accessing said file in said RAM and changing the contents of said file; and
    means for returning said file to said archive in said storage device.

2. The driver of claim 1 wherein said means for accessing and changing the contents of said file is responsive to a request from an operating system.

3. The driver of claim 2 wherein said request from said operating system is selected from the set of requests for reading, writing, opening, and closing said file.

4. The driver of claim 2 wherein said request from said operating system is selected from the set of requests to renaming, copying, moving, deleting, or obtaining the attributes of said file.

5. The driver of claim 1 wherein said file in said RAM is accessible to an operating system and user programs.

6. The driver of claim 1 wherein said driver is part of an operating system.

7. A computer device driver for interfacing with an operating system and application programs, and for accessing modified files held in archives in a memory device, said device driver comprising:
    means for creating virtual folders or directories for archives to represent archives as folders throughout all levels of the operating system and application programs; and
    means for representing files and folders contained in archives as files and folders in virtual folders corresponding to said archives.

8. A computer device driver for interfacing with an operating system and accessing modified files held in archives in a memory device said device driver comprising:
    means for creating virtual folders or directories, said virtual folders and directories representing archives and directories on said memory device and accessible to all levels of said operating system;
    means for representing files and folders contained in said archives as files and folders in the virtual folders and directories corresponding to said archives;
    means for updating said folders and said memory device after an operation from said operating system on said files and virtual folders;
    means for selectively supplying said operating system with information from said virtual folders; and
    means for updating and returning said files and folders to said archive in said memory device.

9. The driver of claim 8 wherein said virtual folder is stored in RAM.

10. The driver of claim 8 further comprising means for receiving a request from said operating system, said request from said operating system selected from the set of requests for reading, writing, opening, and closing said file.

11. The driver of claim 8 further comprising means for receiving a request from said operating system, said request from said operating system selected from the set of requests for renaming, copying, moving, deleting, or obtaining the attributes of said file.

12. A computer device driver for interfacing with an operating system and for accessing modified files held in archives in a memory device, said modified files accessible using a directory structure, said device driver comprising:
    means for creating virtual folders or directories in RAM, said virtual folders and directories representing archives on said memory device and accessible by an operating system;
    means for representing files and folders contained in said archives as files and folders in the virtual folders corresponding to said archives;
    means for reading a modified file from said archive in said memory device, demodifying said file in RAM, and retaining the demodified file in RAM in whole or in part so that operations can be performed on the demodified file by the operating system without having first to write the demodified file to the memory device;

means for accessing said file in said RAM and changing the contents of said file;

means responsive to accessing said files for adjusting said virtual directory structure; and means for returning said file to said archive in said memory device.

13. A device driver for accessing modified computer files held in archives on a memory device and selectively passing information from said files to an operating system, said device driver comprising:

means for identifying and determining an operation requested to be performed by said operating system on a particular modified file on said memory device;

means for extracting said particular modified file from an archive on said memory device, demodifying said particular file, and placing said file in a RAM for a time sufficient to perform said operation;

means for supplying said operating system with information from said modified file in said memory device as needed by said operating system;

means for changing the contents of said file; and means for returning said file to said archive in said memory device.

14. A computer system comprising:

an operating system;

permanent memory for permanently storing archives, said archives containing files and folders;

temporary memory for temporarily storing files, folders, or directories;

a device driver means comprising:

means for creating virtual folders or directories in said temporary memory, said virtual folders and directories representing archives and directories in said permanent memory and accessible by said operating system;

means for representing files and folders contained in said archives as files and folders in the virtual folders and directories corresponding to said archives;

means for updating said virtual directories and said permanent memory directories after an operation on said files and folders;

means for selectively supplying said operating system with information from said files; and means for returning said file to said archive in said permanent memory.

15. The system of claim 14 wherein said permanent memory comprises a plurality of PROMs.

16. The system of claim 14 wherein said temporary memory comprises a plurality of RAM banks.

17. The system of claim 14 further comprising an application program.

18. A method for accessing modified files held in archives in a storage device, said method comprising the steps of:

reading a modified file from an archive in said memory device, demodifying said file in RAM and retaining the demodified file in RAM in whole or in part so that operations can be performed on the demodified file by the operating system without having first to write the demodified file to the storage device, accessing said file in said RAM and changing the contents of said file; and returning said file to said archive in said storage device.

19. A method for accessing modified files held in archives in a memory device, said modified files being accessible using a directory structure, said method comprising the steps of:

creating virtual folders or directories in RAM, said virtual folders and directories representing archives on said memory device and accessible to an operating system;

representing files and folders contained in said archives as files and folders in the virtual folders corresponding to said archives;

reading a modified file from said archive in said memory device, demodifying said file in RAM, and retaining the demodified file in RAM in whole or in part so that operations to the memory device can be performed on the demodified file by the operating system without having first to write the demodified file to the memory device;

accessing said file in said RAM and changing the contents of said file;

adjusting said virtual directory structure; and returning said file to said archive in said memory device.

20. A method for accessing modified computer files held in archives on a memory device and selectively passing information from said files to an operating system, said method comprising the steps of:

identifying and determining an operation requested to be performed by said operating system on a particular modified file on said memory device;

extracting said particular modified file from an archive on said memory device, demodifying said particular file, and placing said file in RAM in whole or in part for a time sufficient to perform said operation;

supplying said operating system with information from said modified file in said memory device as needed by said operating system;

changing the contents of said file; and returning said file to said archive in said memory device.

21. A computer device driver for interfacing with an operating system and for accessing modified files held in archives in a storage device, said device driver comprising:

means for identifying and determining an operation requested to be performed by said operating system on a particular modified file on said storage device;

means for creating virtual folders or directories in RAM, said virtual folders and directories representing archives on said memory device and accessible to an operating system;

means for representing files and folders contained in said archives as files and folders in the virtual folders corresponding to said archives;

means for reading a modified file from an archive in said memory device, demodifying said file in RAM and retaining the demodified file in RAM in whole or in part so that operations can be performed on the demodified file by the operating system without having first to write the demodified file to the storage device, means for copying, moving, renaming, deleting, or getting the attributes of said file;

means for reading, writing, opening or closing said file;

means responsive to copying, moving, renaming, or deleting of a file and adjusting the virtual directory structure;

means for supplying said operating system with information from said modified file in said memory device as needed by said operating system; and means for returning said file to said archive in said memory device.

22. A module of computer code for use with an operating system for accessing compressed files held in archives in a memory device, said module of computer code comprising:
means for creating, in a random access memory (RAM), virtual folders or directories to represent compressed files held in archives as folders or directories accessible to all levels of the operating system, said virtual folders or directories appearing to user programs and the operating system as folders or directories, within an existing folder, containing files and folders but not actually being stored in said memory device.

23. The module of computer code of claim 22 wherein said means for creating virtual folders or directories is responsive to a file system request to enumerate the contents of a compressed file or folder contained in archives in said memory device.

24. The module of computer code of claim 22 further including means for compressing and decompressing files.

25. The module of computer code of claim 22 which includes means for accessing said files represented by said virtual folders or directories in said RAM and changing the contents of said files in response to a request from said operating system.

26. The module of computer code of claim 25 wherein said request from said operating system is a request selected from the group consisting of requests for reading, writing, opening, or closing a file.

27. The module of computer code of claim 25 wherein said request from said operating system is selected from the group consisting of requests for renaming, copying, moving, deleting, or obtaining the attributes of a file.

28. The module of computer code of claim 25 which includes means responsive to accessing said files for adjusting a virtual directory structure.

29. The module of computer code of claim 25 wherein said files in said RAM are accessible to said operating system and user programs.

30. The module of computer code of claim 22 which includes means for reading a compressed file from said memory device, decompressing said file in RAM and retaining the decompressed file so that operations can be performed on the decompressed file by the operating system without having first to write the decompressed file to the memory device.

31. The module of computer code of claim 22 wherein said virtual folders or directories are stored in RAM.

32. The module of computer code of claim 22 further comprising means for receiving a request from said operating system, said request from said operating system being selected from the group consisting of requests for reading, writing, opening, or closing a file.

33. The module of computer code of claim 22 further comprising means for receiving a request from said operating system, said request from said operating system being selected from the group consisting of requests for renaming, copying, moving, deleting, or obtaining the attributes of a file.

34. The module of computer code of claim 22 which includes
means for updating said folders and said memory device after an operation from said operating system on said files and virtual folders,
means for selectively supplying said operating system with information from said virtual folders, and
means for updating and returning said files and folders to said archives in said memory device.

35. The module of computer code of claim 22 which includes means responsive to a file system request to enumerate the contents of a folder for determining whether the request is to enumerate the contents of a virtual folder, and if the answer is affirmative, making available to the operating system the contents of the archive that the virtual folder represents.

36. The module of computer code of claim 22 which includes means responsive to a file system request to enumerate the contents of a folder for determining whether the request is to enumerate the contents of an archive file, and if the answer is affirmative, creating in RAM a virtual folder that represents the archive file and that appears to user programs and the operating system as a folder containing files and folders.

37. The module of computer code of claim 22 which includes means responsive to a request for a file system operation for determining whether the requested operation is for a file contained in a virtual folder and, if the answer is affirmative, performing the requested file system operation.

38. The module of computer code of claim 22 which includes means for making available the contents of said virtual files and folders to all levels of an operating system.

39. The module of computer code of claim 22 which includes means for representing files and folders contained in said archives as files and folders in the virtual files and folders corresponding to said archives.

40. The module of computer code of claim 22 which includes means for reading a compressed file corresponding to a virtual file or folder from said memory device, decompressing said file in RAM so that operations can be performed on the decompressed file by the operating system without having first to write the decompressed file to the memory device.

41. A computer system comprising:
an operating system;
permanent memory for permanently storing archives containing files and folders;
temporary memory for temporarily storing files, folders, or directories; and
a module of computer code comprising: means for creating, in a random access memory (RAM), virtual folders or directories to represent compressed files held in archives as folders or directories accessible to all levels of the operating system, said virtual folders or directories appearing to user programs and the operating system as folders or directories, within an existing folder, containing files and folders but not actually being stored in said memory device.

42. The system of claim 41 wherein said means for creating virtual folders or directories is responsive to a file system request to enumerate the contents of a compressed file or folder contained in archives in said memory device.

43. The system of claim 41 wherein said permanent memory comprises at least one PROM.

44. The system of claim 41 wherein said temporary memory comprises at least one RAM.

45. The system of claim 41 further including an application program.

46. The system of claim 41 further including means for compressing and decompressing files.

47. The system of claim 41 which includes means for accessing said files represented by said virtual folders or directories in said RAM and changing the contents of said files in response to a request from said operating system.

48. The system of claim 47 wherein said request from said operating system is selected from the group consisting of requests for reading, writing, opening, or closing a file.

49. The system of claim 47 wherein said request from said operating system is selected from the group consisting of requests for renaming, copying, moving, deleting, or obtaining the attributes of a file.

50. The system of claim 47 which includes means responsive to accessing said files for adjusting a virtual directory structure.

51. The system of claim 47 wherein said files in said RAM are accessible to said operating system and user programs.

52. The system of claim 41 which includes means for reading a compressed file from said memory device, decompressing said file in RAM and retaining the decompressed file so that operations can be performed on the decompressed file by the operating system without having first to write the decompressed file to the memory device.

53. The system of claim 41 wherein said virtual folders or directories are stored in RAM.

54. The system of claim 41 further comprising means for receiving a request from said operating system, said request from said operating system being selected from the group consisting of requests for reading, writing, opening, or closing a file.

55. The system of claim 41 further comprising means for receiving a request from said operating system, said request from said operating system being selected from the group consisting of requests for renaming, copying, moving, deleting, or obtaining the attributes of a file.

56. The system of claim 41 which includes means for updating said folders and said memory device after an operation from said operating system on said files and virtual folders, means for selectively supplying said operating system with information from said virtual folders, and means for updating and returning said files and folders to said archives in said memory device.

57. The system of claim 41 which includes means responsive to a file system request to enumerate the contents of a folder for determining whether the request is to enumerate the contents of a virtual folder, and if the answer is affirmative, making available to the operating system the contents of the archive that the virtual folder represents.

58. The system of claim 41 which includes means responsive to a file system request to enumerate the contents of a folder for determining whether the request is to enumerate the contents of an archive file, and if the answer is affirmative, creating in RAM a virtual folder that represents the archive file and that appears to user programs and the operating system as a folder containing files and folders.

59. The system of claim 41 which includes means responsive to a request for a file system operation for determining whether the requested operation is for a file contained in a virtual folder and, if the answer is affirmative, performing the requested file system operation.

60. The system of claim 41 which includes means for making available the contents of said virtual files and folders to all levels of an operating system.

61. The system of claim 41 which includes means for representing files and folders contained in said archives as files and folders in the virtual files and folders corresponding to said archives.

62. The system of claim 41 which includes means for reading a compressed file corresponding to a virtual file or folder from said memory device, decompressing said file in RAM so that operations can be performed on the decompressed file by the operating system without having first to write the decompressed file to the memory device.

63. A method for accessing compressed files held in archives in a memory device of a computer system, said method comprising the steps of:

creating, in a random access memory (RAM), virtual folders or directories to represent compressed files held in archives as folders or directories accessible to all levels of an operating system, said virtual folders or directories appearing to user programs and the operating system as folders or directories, within an existing folder, containing files and folders but not actually being stored in said memory device.

64. The method of claim 63 in which said creation of virtual folders or directories is carried out in response to a file system request to enumerate the contents of a compressed file or folder contained in archives in said memory device.

65. The method of claim 63 which includes determining, in response to a request for a file system operation, whether the requested operation is for a file contained in a virtual folder.

66. The method of claim 65 wherein said request for a file system operation is a request selected from the group consisting of requests to rename, copy, move, delete, or obtain the attributes of a file.

67. The method of claim 63 wherein said virtual folders or directories created in said RAM are accessible to said operating system and user programs.

68. The method of claim 63 which further includes updating said virtual folders or directories after an operation on a file or folder, selectively supplying said operating system with information from said file or folder, and returning said file or folder to said archives.

69. The method of claim 63 which further includes compressing and decompressing files.

70. The method of claim 63 which further includes reading a compressed file from said memory device, decompressing said file in RAM and retaining the decompressed file so that operations can be performed on the decompressed file by the operating system without having first to write the decompressed file to the memory device.

71. The method of claim 63 wherein said virtual folders or directories are stored in RAM.

72. The method of claim 63 which further includes determining whether the request to enumerate the contents of a folder is a request to enumerate the contents of a virtual folder, and if the answer is affirmative, making available to the operating system the contents of the archive that the virtual folder represents.

73. The method of claim 63 which further includes determining whether a request to enumerate the contents of a folder is a request to enumerate the contents of an archive file, and if the answer is affirmative, creating in RAM a virtual folder that represents the archive file and that appears to user programs and the operating system as a folder containing files and folders.

74. The method of claim 63 which further includes determining whether a request for a file system operation is a request for an operation for a file contained in a virtual folder and, if the answer is affirmative, performing the requested file system operation.

75. The method of claim 63 which includes making available the contents of said virtual files and folders to all levels of an operating system.

76. The method of claim 63 which includes representing files and folders contained in said archives as files and folders in the virtual files and folders corresponding to said archives.

77. The method of claim 63 which includes reading a compressed file corresponding to a virtual file or folder from said memory device, decompressing said file in RAM so that operations can be performed on the decompressed file by the operating system without having first to write the decompressed file to the memory device.

\* \* \* \* \*